J. A. CHAPMAN.
Shifting-Seat for Vehicles.
No. 227,612. Patented May 18, 1880.
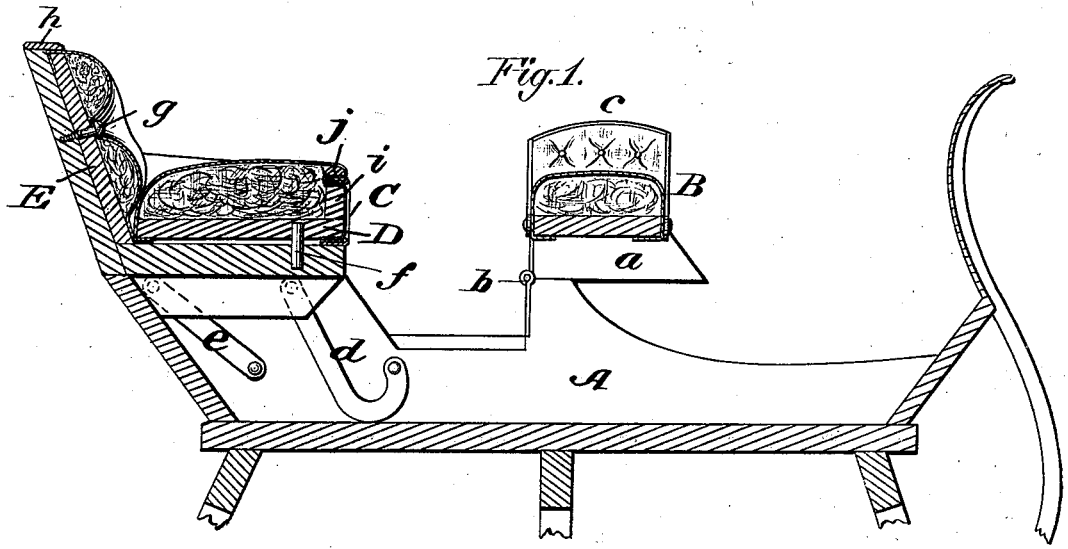
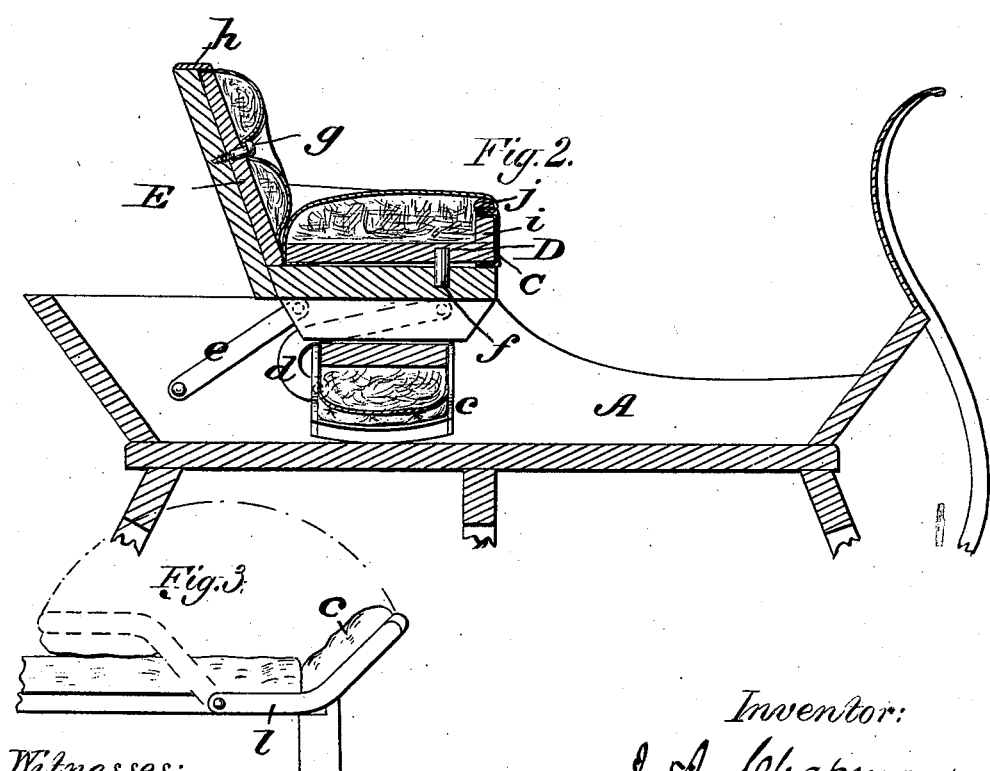
Witnesses:
Donn P. Twitchell
Alex. Scott
Inventor:
J. A. Chapman
By his attys.
Dodge & Son

UNITED STATES PATENT OFFICE.

JOHN A. CHAPMAN, OF WHITE WATER, WISCONSIN.

SHIFTING SEAT FOR VEHICLES.

SPECIFICATION forming part of Letters Patent No. 227,612, dated May 18, 1880.

Application filed July 28, 1879.

*To all whom it may concern:*

Be it known that I, JOHN A. CHAPMAN, of White Water, in the county of Walworth and State of Wisconsin, have invented certain Improvements in Shifting Seats for Sleighs and Wheeled Vehicles, of which the following is a specification.

My invention consists in a peculiar construction and arrangement of shifting seats for sleighs and wheeled vehicles, hereinafter more fully explained.

Figure 1 represents a longitudinal vertical section of a sleigh embodying my improvements, representing both seats in position for use; Fig. 2, a similar view, showing one seat only in position for use and the other in its folded position; Fig. 3, a face view illustrating the construction of the folding or hinged seat.

The primary object of my invention is to produce a vehicle which may be quickly converted from a one-seat to a two-seat form, or vice versa, and which shall in either case present a finished appearance.

To this end I construct the body and seats in the manner represented in Figs. 1 and 2, in which—

A represents the body or box of the vehicle, and B and C two seats, the former of which is hinged to the body in such manner that it may be turned back or down out of the way, in which case its end bars or supports drop into and form a continuation of the sides of the body, or turned out and caused to rest upon the sides in position for use, the seat being represented in its two positions in Figs. 1 and 2.

In order to give the body and the seat the ordinary appearance when the forward seat is opened out, I prefer to form the joint or line of meeting of the body and seat, where the latter folds against the former, either with an inclined front face or in the form of an ogee, thereby giving to both seats a like form on the front.

The seat B is attached to the body by strap-hinges $b$, one leaf of which is carried vertically over the end of the seat end or support $a$ and the other downward over the end of the opening into which the seat folds, as shown, the object of this arrangement being to strengthen the body and seat and prevent either from splitting or fracturing.

As the seat B is arranged to fold within the body A, it is, of course, of a width slightly less than that of the body.

In order that the seat may thus fold within the body and yet possess the desired width when opened out, I provide extension end pieces, $c$, which are connected to the seat by hinged arms $l$, bent upward at their outer ends to give a proper inclination to the ends of the seat, and to permit said ends to be folded over upon the seat when both are upholstered, as shown in Fig. 3, the arms being pivoted sufficiently far from the ends of the seat to permit the ends or extensions to be readily swung upward.

By this arrangement the extensions $c$ may be folded over upon the seat B when the latter is to be turned in out of position for use, or thrown outward to widen and complete the seat when in use.

The seat C is arranged to rest at all times, when in use, upon the sides of the body A, and when used alone to swing forward over the folded front seat, as shown in Fig. 2. In order to permit this manipulation of the seats, the seat C is supplied at each end, within the body A, with two irons, $d$ and $e$, the former curved or bent to pass over the bottom board of the seat B when forward, and the latter being merely a straight bar or link, which acts, in connection with the iron $d$, to maintain the seat at all times in a horizontal position and prevent its rocking or tipping, whether in its forward or rearward position.

Having thus described my invention, what I claim is—

The combination of the body, the front seat, hinged to and arranged to fold backward and downward into the body, and the rear seat, connected to the body at each end by two links, $d$ and $e$, the latter having its lower end curved in a U form, as described and shown.

JOHN A. CHAPMAN.

Witnesses:
SAMUEL BISHOP,
JOSEPH H. PAGE.